3,474,159
SYNTHETIC RUBBER COMPOSITIONS CONTAINING OXIDIZED POLYMER TACKIFIERS

Omar O. Juveland, South Holland, and Robert G. Weisz, Park Forest, Ill., assignors to Standard Oil Company, Chicago, Ill., a corporation of Indiana
No Drawing. Filed Dec. 28, 1966, Ser. No. 605,182
Int. Cl. C08f 37/18, 7/02; B32b 25/14
U.S. Cl. 260—897    4 Claims

ABSTRACT OF THE DISCLOSURE

New polymer compositions exhibiting tackiness are made by combining a synthetic ethylene/propylene rubber with a polymeric oxidized alkyl styrene.

---

This invention relates to the use of polymer compositions containing carboxy aryl groups as additives for rubbers. More particularly, our invention pertains to use of polymer compositions prepared by homopolymerization or copolymerization of alkyl-substituted styrene compounds, followed by oxidation. Such oxidation products can be used as adhesion improvers in rubbers, particularly synthetic rubbers.

Polymers useful in the practice of our invention comprise oxidation products of the homopolymers of monoalkyl and polyalkyl styrenes and monoalkyl and polyalkyl alpha-methylstyrenes. Useful oxidized copolymers of our invention comprise the aforementioned monomers in combination with each other and in combination, singly or together, with copolymerizable 1-olefins such as ethylene, propylene, butene-1, propene-1, pentene-1, hexene-1 and the like, as well as copolymerizable diolefins, such as butadiene, isoprene and the like. Copolymerizable aromatics such as styrene can also be made part of our copolymer compositions for use in rubbers. Polymeric materials prepared from such monomers by methods known to the art are converted to the carboxy derivatives by oxidation with techniques known for the oxidation of ring-substituted alkyl groups. In particular, our useful polymer compositions are those made from meta- and para-monomethyl styrene and dimethyl styrene and the alpha-methyl styrene homologues thereof.

The polymers useful in our invention can be added to rubbers, particularly synthetic rubbers, in order to effect the adhesion of rubbers during fabrication operations. These polymers are especially useful in providing ethylene-propylene rubbers, well known to this art, with the property of tack. Synthetic rubbers generally are less tacky than natural rubber and it is difficult to produce a compounded stock which can be fabricated into tires or other articles with the same ease as stock compounded from natural rubber. Tackifiers heretofore known to the art are not always satisfactory in providing the necessary tack for tire building operations, especially when a manufacturer uses ethylene-propylene base synthetic rubbers in the stock. A tire is generally built on a collapsible drum. Tire cord is applied in contact with the drum, the tire beads are applied and an extruded rubber tread section is made into a band and rolled down upon the tire sub-assembly. In these operations, the property which is depended upon to hold the components of the tire in place is tack. Tack, in rubber technology, is defined as the property of a rubber or compounded stock which causes two layers of stock which have been pressed together to adhere so firmly that they cannot be pulled apart at the areas of contact. The difficulty in producing synthetic rubbers with sufficient tack for tire building operations is such that tires made from many synthetic rubbers are cemented with a natural rubber cement to provide the necessary tack for tire building operations.

These compositions can be used as tackifiers in natural rubber and synthetic rubber. We have found them to be especially valuable as tackifiers for ethylene-propylene synthetic rubber stock. Other tackifying compositions known to the art have generally been found to be deficient when applied to these stocks. The compounding of these tackifying compositions with the rubber stock can be carried out in accordance with the ordinary techniques known to workers skilled in this art. In compounding the stocks made in accordance with our invention it is sometimes observed that there is some difficulty in dispersing the more highly oxidized polymers. In such event, we have found that dissolving the oxidized polymer in a non-reactive, commercial plasticizer before compounding will accelerate the rate of dispersion of the polymer. Specific examples of the preparation of synthetic rubber stock incorporating our novel compositions are set forth hereinbelow.

The polymers useful in our invention are made by polymerization of known monomers followed by oxidation. The polymerization reactions can be accomplished with ordinary polymerization techniques using, for example, free radical catalysts, acidic catalysts, and other catalysts well known to the art. For many applications, the monomers are desirably polymerized to polymers containing from 2 to 500 monomer units, though even higher degrees of polymerization may be desirable for some applications of the oxidized polymer compositions. We have found that an oxidized polymer containing from 2 to 40 monomer units is desirable for use as an additive to rubbers and we generally prefer to prepare such polymers containing from 2 to 15 monomer units. In particular, oxidized polymers having a molecular weight range of about 250 to about 900 are useful tackifiers. The amount of oxidation of our polymers appears to have an effect upon the degree of tack provided. The tack of a particular rubber stock can be adjusted over a broad range by selection of a polymer having a greater or lesser number of oxidized substituents per polymer molecule. We have found that it is desirable to have an average carboxyl group content of at least one carboxyl group per four monomeric substituted styrene groups in the polymer molecule and we prefer to have two or more for best tackifying properties.

The preparation of some methyl-substituted polymers from methyl-substituted alpha-methylstyrenes is set forth hereinbelow in conjunction with a description of their oxidation as exemplary of the aforedescribed preparative techniques for making the starting material from which our carboxy-substituted polymers can be made.

The preparation of a carboxy-substituted polymer composition by oxidation of 3,4-dimethyl alpha-methylstyrene homopolymer was accomplished as follows:

EXAMPLE 1

Into a one-gallon, glass-lined reactor, fitted with a Magne-Drive stirrer, there was added 350 g. of poly-3,4-dimethyl alpha-methyl styrene, having a molecular weight of about 660. To this was added 1300 cc. of acetic acid, 400 cc. of benzene, 22.4 g. cobalt acetate hydrate and 7.2 g. bromine. The mixture was heated to 98° C. under 20 to 30 p.s.i.g. oxygen. In 80 minutes, 22 g. of oxygen was consumed and the mixture was cooled. The oxidation product was recovered by precipitation upon addition of water and separation of the precipitate. The yield was 384 g. of product having a saponification number of 94 mg. KOH/g., corresponding to about 1.2 carboxyl groups per polymer molecule.

EXAMPLE 2

Another polymer oxidation was conducted, using the conditions of Example 1 with the difference that oxidation was allowed to continue until 63 g. of oxygen had been consumed. The product was worked up in similar fashion and there was obtained 404 g. of polymer having a saponification number of 168 mg. KOH/g., which corresponds to about 2.2 carboxyl groups per polymer molecule.

In similar fashion oxidation products can be prepared from ring methyl-substituted styrenes. The preparation of additional oxidation products useful as tackifying compositions within the scope of our invention is set forth in copending application S.N. 605,179, Juveland case A–557, entitled "Carboxy-Substituted Polymers."

Oxidized polymers such as described hereinabove can be made in similar fashion from starting materials containing lower alkyl groups other than methyl; for example, by using alkyl styrenes and alkyl alpha-methyl styrenes containing one or more ethyl, propyl, butyl or pentyl groups as the alkyl substituents.

The usefulness of the products within the scope of our disclosure has been demonstrated by preparing adhesive tapes based upon ethylene-propylene terpolymers. A sample of the product of Example 2 was used to prepare a tape according to the following procedure. Such tapes are useful as sealants, for example, for sealing auto glass to an auto body.

EXAMPLE 3

A blend of 320 parts by weight of ethylene-propylene non-conjugated diene terpolymer (Nordell 1040), 64 parts of the polymer product of Example 1, 320 parts of Amopol C175 polypropylene resin, a polypropylene having a molecular weight of about 1120, 64 parts carbon black, 16 parts zinc oxide, 3 parts stearic acid, 2.1 parts ethyl tuads accelerator and 1.6 parts sulfur was made and cured for 13 minutes at 300° F. The material was cured in the form of a tape ½″ x ½″ x 6″. This tape was evaluated for adhesive and cohesive properties by compressing it between a primed metal panel and a primed glass panel and then pulling the adhered unit in a tensile machine. The yield strength in pounds was found to be 15.2, while the cohesive and adhesive failure amounted to 70 and 30 percent, respectively. A similar blend of material containing the non-oxidized precursor of the oxidized polymer used in Example 3 was also made and tested for adhesive and cohesive properties. The yield strength in pounds was found to be 13.0, while the cohesive and adhesive failure amounted to 50%, each.

Another blend was made as described above but with the substitution of the polymer made according to Example 2 for the unoxidized polymer of the preceding test. The yield strength for the tape was found to be 18.8 lbs. while the cohesive and adhesive failure amounted to 90 and 10%, respectively. The above results indicate that the polymers of our invention are useful in altering the adhesive properties of synthetic rubber stocks and that the extent of alteration can be varied depending upon the amount of oxidation to which the resins of our invention have been subjected. In similar fashion, the adhesive properties of other synthetic rubbers can be altered.

The usefulness of our invention in improving the tack of an ethylene-propylene terpolymer stock is shown by the following experiment:

EXAMPLE 4

A blend of 150 parts by weight of ethylene-propylene non-conjugated diene terpolymer (Nordell 1040E), 80 parts of carbon black, 5 parts of zinc oxide, 1 part of stearic acid, 1.5 parts of Monex accelerator (tetramethylthiuram monosulfide) and 0.75 part of MBT accelerator (mercaptobenzothiazol) was master-batched on a two-roll rubber mill. There was added 1.5 parts of sulfur and 10 parts of the polymer made in accordance with Example 2. The polymers and sulfur were milled into the sample of stock and the stock was then calendered to 40 mil sheet. Next, four-inch squares of stock were folded corner-to-corner, pressed with a 4 pound roller and pulled apart. The tack ratings of the stock containing the oxidized polymer of Example 2 were observed to be as follows:

| Tack ratings: | Example 2 polymer |
|---|---|
| Initial | Good. |
| After 1 hour | Good. |
| After 24 hours | Good. |

Having thus described our invention, what we claim is:

1. Synthetic rubber compositions comprising an ethylene-propylene synthetic rubber stock and a polymer having a molecular weight in the range of about 250 to about 900 and a saponification number equivalent to at least about two carboxyl groups per molecule comprising monomer units represented by the formula

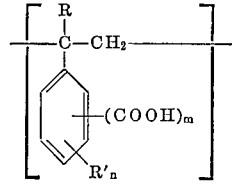

wherein R is hydrogen or methyl, R' is an alkyl group, $m$ is at least one, and the sum of $m$ plus $n$ is from 1 through 5, said monomeric units being present in an amount sufficient to affect the adhesive property of said compositions.

2. The synthetic rubber compositions of claim 1 wherein said monomeric units are in copolymeric relationship with monomeric units having the formula

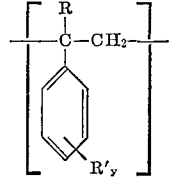

wherein R is hydrogen or methyl, R' is an alkyl group and $y$ is an integer of from 1 through 5.

3. The synthetic rubber composition of claim 2 wherein said monomeric units are in copolymeric relationship with monomeric units derived from 1-olefins containing up to 6 carbon atoms, butadiene, styrene, isoprene or mixtures thereof.

4. The composition of claim 1 wherein said synthetic rubber composition comprises an ethylene-propylene non-conjugated diene terpolymer admixed with an oxidized poly-3,4-dimethyl-alpha-methylstyrene having a molecular weight in the range of about 250 to about 900 and a saponification number equivalent to at least about two carboxyl groups per molecule.

References Cited

UNITED STATES PATENTS

| 2,894,917 | 7/1959 | Tsunoda et al. | 260—22 |
| 3,423,382 | 1/1969 | Chibnik | 260—93.5 |

OTHER REFERENCES

Schildknecht: Vinyl and Related Polymers, p. 154, textbook, 4/1962 pub.

MURRAY TILLMAN, Primary Examiner

C. J. SECCURO, Assistant Examiner

U.S. Cl. X.R.

156—334; 161—203, 216, 247; 260—889, 93.5